Patented Sept. 25, 1951

2,569,405

UNITED STATES PATENT OFFICE 2,569,405

VINYL CHLORIDE POLYMERS PLASTICIZED WITH ESTERS OF (1',2'-DICARBOXY-ETHYL) UNDECYLENIC ACID

Joachim Dazzi, Dayton, Ohio, assignor to Monsanto Chemical Company, St. Louis, Mo., a corporation of Delaware No Drawing. Application February 15, 1950,
Serial No. 144,392

6 Claims. (Cl. 260—31.8)

This invention relates to compositions comprising polyvinyl halides and relates more particularly to compositions comprising polyvinyl chloride polymers plasticized with esters of (1',2'-dicarboxyethyl) undecylenic acid as plasticizers.

A wide variety of plasticizers has been employed for the purpose of improving the physical properties of polyvinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition, such as low volatility, color and heat stability, water absorption, etc.

Now I have found that very good flexibility, without sacrifice of temperature stability and low volatility is imparted to vinyl chloride polymers when there are employed with the polymers certain alkyl esters of (1',2'-dicarboxyethyl) undecylenic acid. Esters of this type are disclosed in the Clocker patents, U. S. Nos. 2,188,882 and 2,188,883, and in the article by Ross, Gebhart, and Gerecht, appearing in the Journal of the American Chemical Society, p. 1373 (1946). Briefly, they are obtainable by the addition reaction of maleic anhydride with undecylenic acid or its esters. While isomeric products are possible, and the position at which the anhydride residue is attached to the undecylenic acid is not known, the reaction of an alkyl undecylenate with maleic anhydride proceeds probably according to the scheme:

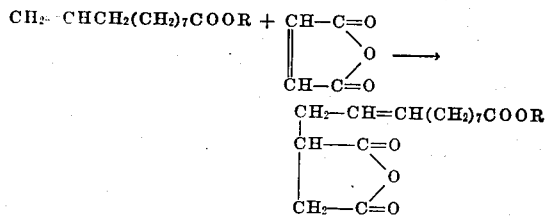

wherein R is an alkyl group of from 1 to 8 carbon atoms.

Esterification of the resulting adduct with a lower alkyl alcohol, preferably an alcohol of from 1 to 8 carbon atoms, yields the trialkyl ester which probably has the structure:

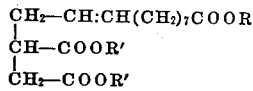

wherein R and R' are alkyl groups of from 1 to 8 carbon atoms. Mixed esters are thus obtainable.

Because of uncertainty concerning the position at which the maleic residue is attached to the undecylenic group, the present esters will be hereinafter referred to without stipulating the position of the (1',2'-dicarboxyethyl) group.

I have found that in order to obtain stable, light-colored adducts certain reaction conditions must be adhered to carefully. For example, while the addition of maleic anhydride to undecylenic acid takes place under varying reaction conditions, useful plasticizers for the present purpose are best prepared by conducting the reaction for comparatively short periods of time, say, from 1 hour to 8 hours, at relatively low temperatures, i. e., at temperatures not exceeding the decomposition point of the initial reactants. I have found also that great care should be used in isolating the desired products. After esterification I preferably fractionate the crude reaction mixture under a very low vacuum, i. e., at vacuums of 1 mm. of mercury or less. Fractionation at such low pressures minimizes the formation of dark-colored impurities whose presence in the finished product leads to poor plasticized compositions. Dark-colored impurities are also avoided by preparing the trialkyl (1',2'-dicarboxyethyl) undecylenates according to the procedure described in my copending application, Serial No. 144,393, filed February 15, 1950.

The trialkyl (1',2'-dicarboxyethyl) undecylenates are valuable plasticizers for polyvinyl chloride and copolymers of at least 70 per cent by weight of vinyl chloride and up to 30 per cent by weight of an unsaturated monomer copolymerized therewith, for example vinyl acetate, vinylidene chloride, etc. Adducts of acyclic olefinic acids and long-chained unsaturated acids have been hitherto generally suggested for use as softening agents. I have now found, however, that the alkyl (1',2'-dicarboalkoxy) undecylenates in which the alkyl radicals have from 1 to 8 carbon atoms are of outstanding value as plasticizers, these esters serving not only to soften vinyl chloride polymers, but also to impart simultaneously a high degree of low temperature flexibility, very good temperature stability, and great mechanical strength to these polymers. While many of the esters encompassed by the Clocker patents referred to above are incompatible with polymers and copolymers of vinyl chloride and do not give continuous, homogeneous compositions, esters of (1',2'-dicarboxyethyl) undecylenic acid with aliphatic alcohols of from 1 to 8 carbon atoms are compatible with vinyl chloride polymers and show no exudation of plasticizer even at plasticizer content of up to 50 per cent. Although the quantity of plasticizer will depend upon the particular of polymer to be plasticized and upon its molecular weight, it is generally found that compositions having from 5 per cent to 50 per cent by weight of plasticizer, will in most cases be satisfactory for general utility. The good flexibility of the plasticized composition increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

The invention is further illustrated but not limited by the following example:

*Example*

Sixty parts of polyvinyl chloride and 40 parts by weight of the tri-n-butyl ester of (1',2'-dicarboxyethyl) undecylenic acid are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 48° C., which value denotes extremely good low temperature properties. Tests on the volatility characteristics of the plasticized composition gave a value of 1.20 per cent which shows very good retention of plasticizer and indicates good temperature characteristics of the composition. The plasticized material had a hardness of 67 before the volatility test and a hardness of 68 after the volatility test. When subjected to heat at a temperature of 325° F. for a period of 30 minutes the clarity and color of the molded product was substantially unchanged. Tests of the water resistance properties of the plasticized material employing the test procedure described above showed a solids-loss of only 0.07 per cent and an 0.41 per cent water absorption value.

Instead of the esters employed in the example above, other trialkyl esters of (1',2'-dicarboxyethyl) undecylenic acid with aliphatic alcohols of from 1 to 8 carbon atoms give similarly valuable plasticized polyvinyl chloride compositions. Thus, by employing 40 parts by weight of the tri-methyl, tri-ethyl, tri-isopropyl or tri-n-octyl ester of (1',2'-dicarboxyethyl) undecylenic acid with 60 parts by weight of polyvinyl chloride, there are obtained clear, colorless compositions of very good flexibility and stability. The tri-isoamyl, the tri-(2-ethylhexyl), and the tri-n-hexyl esters of (1',2'-dicarboxyethyl) undecylenic acid give similarly good results when employed as plasticizers for polyvinyl chloride and copolymers of vinyl chloride.

While the above example shows only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over a wide range of concentrations, up to 50 per cent of esters based on the total weight of the plasticized composition yielding desirable products.

Although the invention has been described particularly with reference to the use of the present trialkyl esters of (1',2'-dicarboxyethyl) undecylenic acid as plasticizers for polyvinyl chloride, these esters are advantageously employed also as plasticizers for copolymers of vinyl chloride, for example, the copolymers of vinyl chloride with vinyl acetate, vinylidene chloride, methyl methacrylate, acrylonitrile, butadiene, or styrene. Preferably, such copolymers have a high vinyl chloride content, i. e., a vinyl chloride content of at least 70 per cent copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized materials, does not impair the valuable properties of the present esters. The present esters are of general utility in softening vinyl chloride polymers. They may be used as the only plasticizing component in a compounded vinyl chloride polymer or they may be used in conjunction with other plasticizers.

What I claim is:

1. A resinous composition comprising a vinyl chloride polymer plasticized with a trialkyl ester of (1',2'-dicarboxyethyl) undecylenic acid and an aliphatic alcohol of from 1 to 8 carbon atoms.

2. A resinous composition comprising polyvinyl chloride plasticized with a trialkyl ester of (1',2'-dicarboxyethyl) undecylenic acid and an aliphatic alcohol of from 1 to 8 carbon atoms.

3. A resinous composition comprising polyvinyl chloride plasticized with a trialkyl ester of (1',2'-dicarboxyethyl) undecylenic acid and an aliphatic alcohol of from 1 to 8 carbon atoms, said ester being from 5 to 50 per cent of the weight of the composition.

4. A resinous composition comprising a copolymer of at least 70 per cent by weight of vinyl chloride and up to 30 per cent by weight of an unsaturated monomer copolymerizable therewith, said copolymer being plasticized with a trialkyl ester of (1',2'-dicarboxyethyl) undecylenic acid and an aliphatic alcohol of from 1 to 8 carbon atoms.

5. A resinous composition comprising a copolymer of at least 70 per cent by weight of vinyl chloride and up to 30 per cent by weight of an unsaturated monomer copolymerizable therewith, said copolymer being plasticized with a trialkyl ester of (1',2'-dicarboxyethyl) undecylenic acid and an aliphatic alcohol of from 1 to 8 carbon atoms and said ester being from 5 to 50 per cent of the weight of the composition.

6. A resinous composition comprising polyvinyl chloride plasticized with the tri-n-butyl ester of (1',2'-dicarboxyethyl) undecylenic acid, said ester being from 5 to 50 per cent of the weight of the composition.

JOACHIM DAZZI.

REFERENCES CITED

The following references are of record in the file of this patent:

UNITED STATES PATENTS

| Number | Name | Date |
|---|---|---|
| 2,360,896 | Sarbach | Oct. 24, 1944 |